(No Model.)
W. E. WALLER.
HORSE COLLAR.
No. 319,044. Patented June 2, 1885.
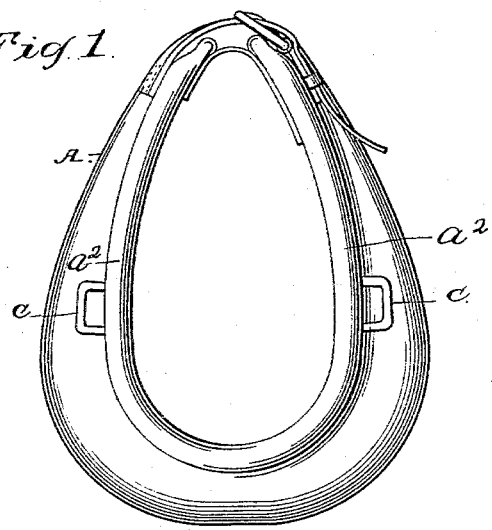
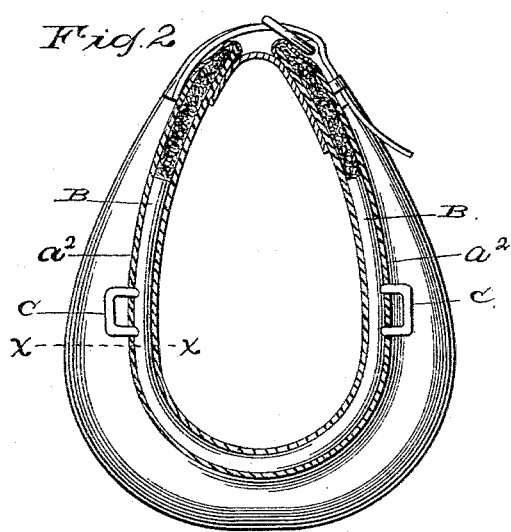
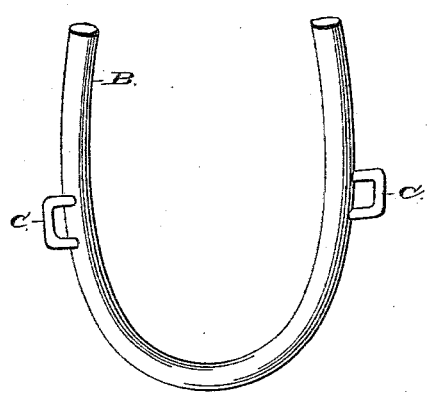
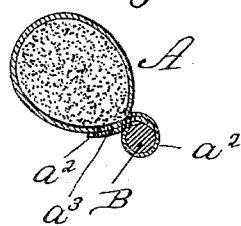
WITNESSES
M. E. Fowler
E. G. Diggers
INVENTOR
W. E. Waller
By his Attorneys
C. A. Snow & Co.
N. PETERS. Photo-Lithographer, Washington, D. C.

United States Patent Office.

WARREN E. WALLER, OF CHARLES CITY, IOWA.

HORSE-COLLAR.

SPECIFICATION forming part of Letters Patent No. 319,044, dated June 2, 1885.

Application filed March 14, 1885. (No model.)

*To all whom it may concern:*

Be it known that I, WARREN E. WALLER, a citizen of the United States, residing at Charles City, in the county of Floyd and State of Iowa, have invented a new and useful Improvement in Horse-Collars, of which the following is a specification, reference being had to the accompanying drawings.

My invention relates to horse-collars; and it has for its object to provide the same with a draft attachment designed to be permanently secured to the collar and to obviate the use or take the place of the hame ordinarily employed.

A further object of the invention is to provide a draft attachment which shall be simple in its construction, effective in its operation, strong and durable, and one that may be readily attached to a horse-collar in the process of manufacturing the same.

With these ends in view the invention consists in the details of construction that will be hereinafter fully set forth.

In the drawings, Figure 1 is a perspective view of a horse-collar constructed in accordance with my invention. Fig. 2 is a transverse vertical section of the same. Fig. 3 is a detail view of the frame detached. Fig. 4 is an enlarged detail transverse sectional view taken on the line $x$ $x$ of Fig. 2.

In the accompanying drawings, in which like letters of reference indicate corresponding parts in all the figures, A represents a horse-collar, which is, as usual, open at its upper end, and adapted to be closed by a strap and buckle, as shown. Secured to the inner edge of the collar, but extending outwardly therefrom, is a frame, B, which is covered with leather, as shown. The said frame B is preferably constructed of metal bent to the proper shape, and conforms to the shape of the collar, being rounded at its lower ends, and having its ends or sides extending upwardly on the collar on a line with the sides of the latter. The ends of the said frame B terminate at a point from the top of the collar equal to about one-third its length. By this arrangement it will be seen that the collar is flexible at its upper end and can be bent when the strap for securing the ends together is tightened. It can also be spread apart at its upper end when being placed in position upon the neck of a horse.

Upon sides of the frame B, at points a slight distance from the upper ends of the frame, are formed loops C, which extend outwardly in opposite directions, said loops being adapted to receive the ends of the traces, which may be provided with any suitable arrangement of devices for attachment thereto.

In order to secure the above-described draft attachment to the collar I provide the covering of the collar with the extended flaps $a^2$, which are bent around the attachment B, entirely surrounding the same, and the free ends of the flaps are secured by being sewed to the covering, as at $a^3$. A filling—such as hair—is placed in the spaces formed by the flaps above the ends of the frame B. By this construction the frame B is entirely hidden from sight, and is enveloped in the covering of the collar.

By the use of the improvements before described, the employment of a hame is unnecessary, thus saving considerable time and trouble and also expense, as my improvements can be supplied at a very slight cost.

A horse-collar constructed as above described is neat and attractive in appearance, may be readily and quickly adjusted in position upon a horse, and is thoroughly serviceable in use.

I am aware that it has been heretofore proposed to secure a flat bent metallic frame in the lower portion of a horse-collar, in order to stiffen that portion of the collar that bears against the shoulders of the animal, and this I disclaim.

I am also aware that it has been heretofore proposed to secure a flat bent metallic draft-frame in the covering of a horse-collar, the ends of said frame extending entirely up to the top of the collar, the frame being provided with a spring portion at its lower end, and the collar being divided at this point to admit of its being opened in order to pass the collar around the neck of the animal, and this also I disclaim.

I am further aware that it has been heretofore proposed to secure hames that are hinged together at their upper or lower ends in the covering of a horse-collar, and this also I disclaim.

My invention differs from these constructions in that I inclose a draft-frame that is formed of metal and is rigid in the lower portion of the collar, and provide the upper portions of the collar, above the ends of the rigid draft-frame, with hair or other filling, which renders the upper portions of the collar flexible, and enables the upper ends of the collar to be drawn apart in order to slip the collar over the neck of the horse, and, further, in providing the covering of the collar, on the front side thereof, with flaps that are bent around the draft-frame and have their free ends sewed to covering of the collar, and thus I secure the draft-frame to the front side of the collar in such a manner that the frame cannot work rearwardly in the stuffing of the collar, and thus I obviate an objection to which some of the hereinbefore disclaimed constructions are open.

Having fully described my invention, what I claim as new and desire to secure by Letters Patent, is—

A horse-collar having extended flaps $a^2$ on its front side, and a draft-frame around which the flaps are bent and secured, whereby the draft-frame is secured to the front side of the collar and prevented from working rearwardly through the stuffing therein, substantially as described.

In testimony that I claim the foregoing as my own I have hereto affixed my signature in presence of two witnesses.

WARREN E. WALLER.

Witnesses:
T. W. CLAPP,
H. C. INLAND.